(12) United States Patent
Naseh

(10) Patent No.: US 8,028,086 B2
(45) Date of Patent: Sep. 27, 2011

(54) VIRTUAL SERVER RECIRCULATION

(75) Inventor: Zeeshan Naseh, Richardson, TX (US)

(73) Assignee: Cisco Technology, Inc., San Jose, CA (US)

( * ) Notice: Subject to any disclaimer, the term of this patent is extended or adjusted under 35 U.S.C. 154(b) by 733 days.

(21) Appl. No.: 11/788,725

(22) Filed: Apr. 19, 2007

(65) Prior Publication Data

US 2008/0263205 A1     Oct. 23, 2008

(51) Int. Cl.
*G06F 15/173* (2006.01)
(52) U.S. Cl. .................... 709/238; 709/239; 709/240
(58) Field of Classification Search .............. 709/232, 709/238–240
See application file for complete search history.

(56) References Cited

U.S. PATENT DOCUMENTS

| 6,779,017 | B1 | 8/2004 | Lamberton et al. |
| 7,111,162 | B1 | 9/2006 | Bagepalli et al. |
| 2003/0097405 | A1 | 5/2003 | Laux et al. |
| 2003/0149755 | A1 | 8/2003 | Sadot |
| 2004/0210663 | A1* | 10/2004 | Phillips et al. ............. 709/230 |
| 2005/0060427 | A1* | 3/2005 | Phillips et al. ............. 709/238 |
| 2005/0081211 | A1 | 4/2005 | Koga et al. |
| 2005/0132030 | A1* | 6/2005 | Hopen et al. ............... 709/223 |
| 2005/0220072 | A1* | 10/2005 | Boustead et al. ............ 370/351 |
| 2006/0031506 | A1* | 2/2006 | Redgate ..................... 709/226 |

* cited by examiner

*Primary Examiner* — Patrice Winder
*Assistant Examiner* — Ebrahim Golabbakhsh
(74) *Attorney, Agent, or Firm* — Patent Capital Group

(57) ABSTRACT

In one embodiment, a method can include: (i) classifying a packet in a server load balancer (SLB) for determining if the packet is destined for a virtual Internet protocol (VIP) address hosted on the SLB; (ii) selecting a server from a group of servers representing the VIP address; (iii) changing a destination IP address of the packet from the VIP address to a real IP address of the selected server; and (iv) recirculating the packet for repeating the classifying.

14 Claims, 5 Drawing Sheets

VIRTUAL SERVER RECIRCULATION

TECHNICAL FIELD

The present disclosure relates generally to server load balancing devices.

BACKGROUND

Server load balancing (SLB) is a key service provided in many conventional data centers today. This load balancing can be performed at any layer of OSI model (Open Systems Interconnection Basic Reference Model) from layer 3 to layer 7, depending on the particular application hosted on the server.

Other devices can be load balanced by content switches, such as firewalls, Web application or database servers, virtual private network (VPN) concentrators, caches, and secure sockets layer (SSL) offload devices. An SLB device may "virtualize" a group of servers, and load balance user requests to that virtual group. Typically, a user request may get classified, a server may be selected, network address translation (NAT) can occur, and then the request can be sent to the server.

DESCRIPTION OF EXAMPLE EMBODIMENTS

Overview

In one embodiment, a method can include: (i) classifying a packet in a server load balancer (SLB) for determining if the packet is destined for a virtual Internet protocol (VIP) address hosted on the SLB; (ii) selecting a server from a group of servers representing the VIP address; (iii) changing a destination IP address of the packet from the VIP address to a real IP address of the selected server; and (iv) recirculating the packet for repeating the classifying.

In one embodiment, an apparatus can include: (i) an SLB having an input configured to receive a packet for classification to determine if the packet is destined for a VIP address hosted on the SLB; (ii) logic configured to select a server from a group of servers representing the VIP address; (iii) logic configured to change a destination IP address of the packet from the VIP address to a real IP address of the selected server; and (iv) logic configured to recirculate the packet for repeating the classification.

Example Embodiments

Figure 1:
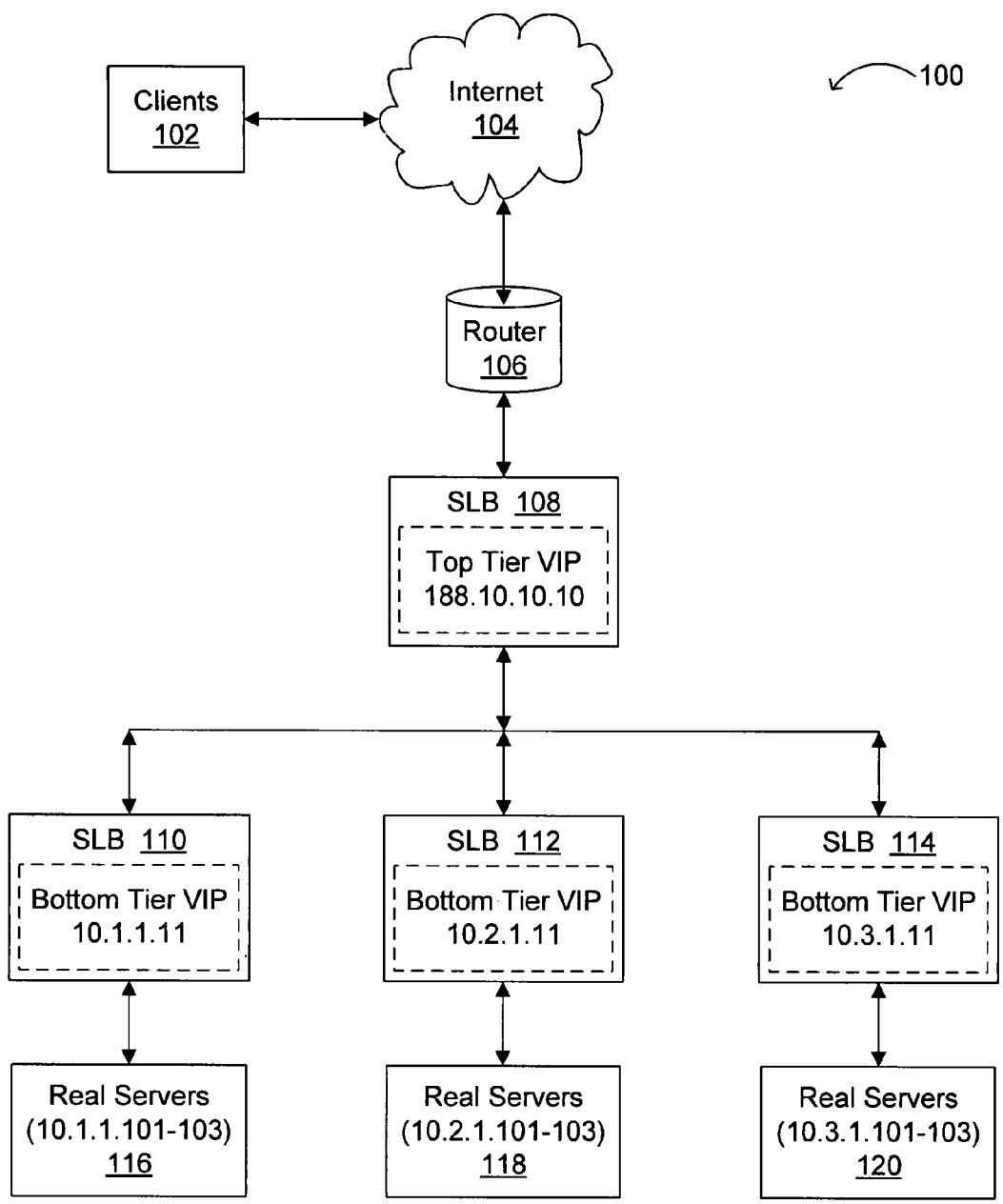
FIG. 1 illustrates an example cascaded server load balancer (SLB) arrangement.

Referring now to FIG. 1, an example cascaded server load balancer (SLB) arrangement is shown and indicated by the general reference character 100. Clients 102 and router 106 can interface with Internet 104. For example, clients 102 can include any application or computing device that may send requests, such as packets, to a server. Such a request can be routed (e.g., via a router 106) to SLB 108.

In a typical structure having cascading SLB devices, SLB 108 can include a top tier virtual Internet protocol (VIP) address (e.g., 188.10.10.10). SLB 108 can interface with SLB 110 including a bottom tier VIP (e.g., 10.1.1.11), SLB 112 including a bottom tier VIP (e.g., 10.2.1.11), and SLB 114 including a bottom tier VIP (e.g., 10.3.1.11). For example, SLB 110 can interface with real servers 116 (e.g., 10.1.1.101-103), SLB 112 can interface with real servers 118 (e.g., 10.2.1.101-103), and SLB 114 can interface with real servers 120 (e.g., 10.3.1.101-103).

Figure 2:
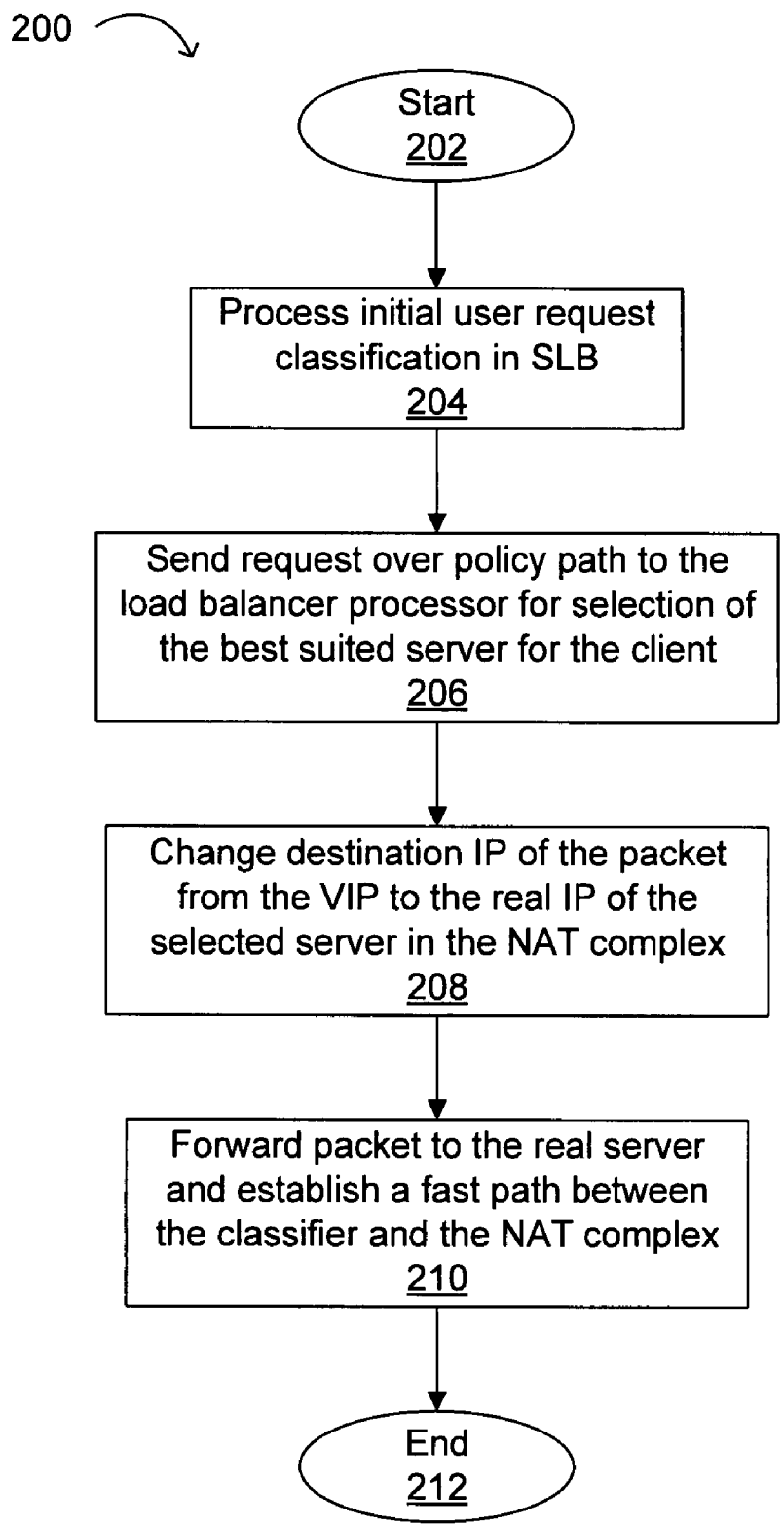
FIG. 2 illustrates an example flow for the arrangement of FIG. 1.

Referring now to FIG. 2, an example flow for the arrangement of FIG. 1 is shown and indicated by the general reference character 200. The flow can begin (202) once a user request (e.g., from a client) is received, and the initial user request can be classified in an SLB (204). This initial user request classification may be performed to determine if a packet is destined for a VIP hosted on the SLB device. Next, the request can be sent over a policy path to a load balancer processor for selection of the best suited server for the client (206). For example, if there are no existing flows and a VIP match is found, then the request may be sent over the policy path to the load balancer process/CPU, where a best suited server for the client may be selected (e.g., a server from the group of servers that represent the VIP address). Further, the server selection can be done on a single or multiple policy match basis.

The destination IP of the packet can be changed from the VIP to the real IP of the selected server in a network address translation (NAT) complex (208). Thus, the packet can be forwarded to an NAT complex, where the destination IP address of the packet may be changed. The packet may then be forwarded to the real server, a fast path can be established between a classifier and the NAT complex (210), and the flow can complete (212). With the fast path, the load balancer or policy processing CPU may be bypassed. Accordingly, the user request may typically flow through an SLB device once in a given path.

Figure 3:
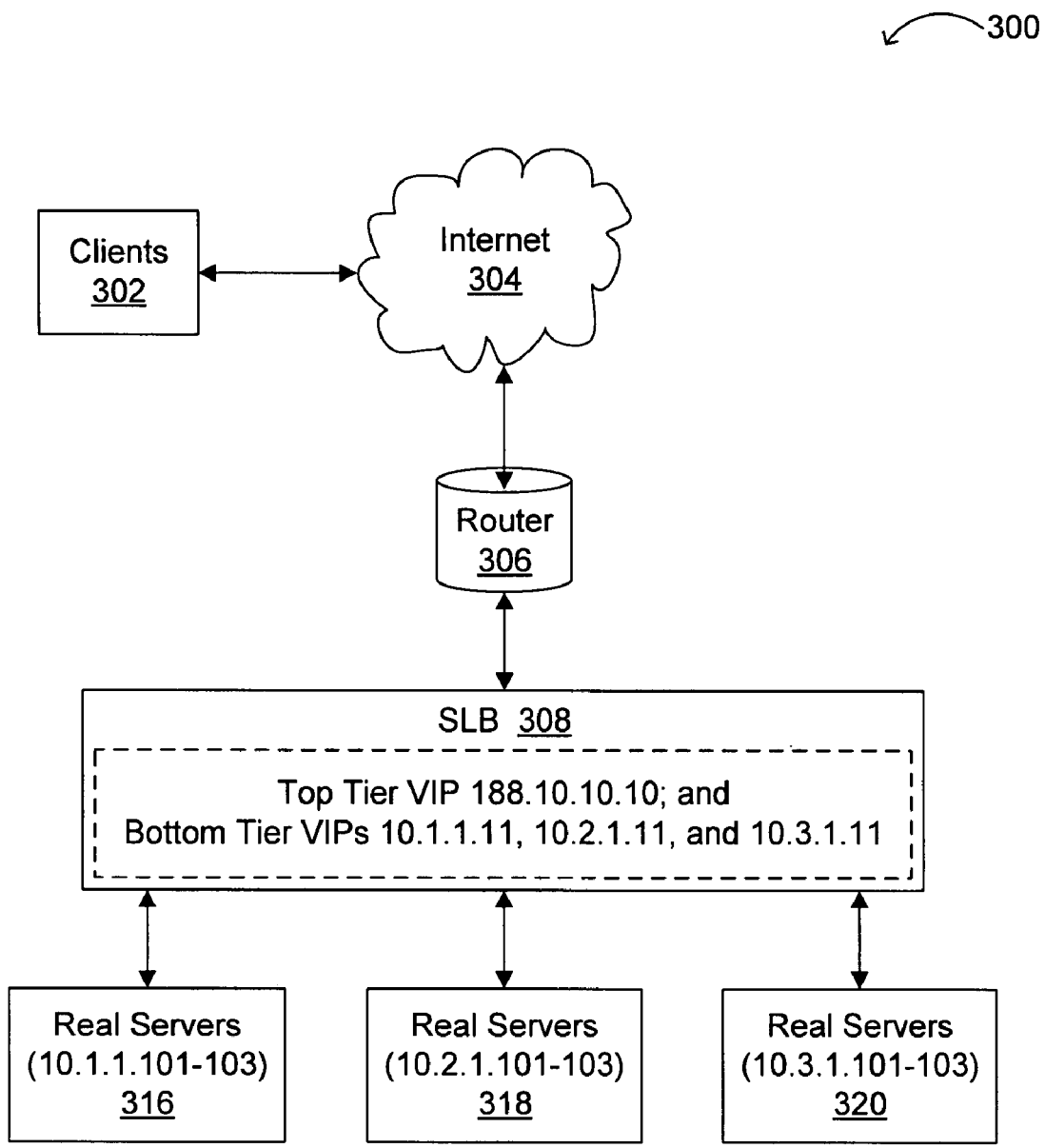
FIG. 3 illustrates an example SLB with virtual server recirculation.

In particular embodiments, a method of recirculating a user request can include repeated classification in the same SLB device. Thus, cascading VIP addresses can be utilized in one SLB device. Referring now to FIG. 3, an example SLB with virtual server recirculation is shown and indicated by the general reference character 300. Clients 302 and router 306 can interface with Internet 304, and clients 302 can include any application or computing device that may send requests (e.g., including packets) to a server.

SLB 308 can interface with router 306, as well as real servers 316, 318, and 320. For example, SLB 308 can include a top tier VIP (e.g., 188.10.10.10), and bottom tier VIPs (e.g., 10.1.1.11, 10.2.1.11, and 10.3.1.11). Thus, all such cascading VIPs may reside on the same SLB device 308. For example, SLB 308 can interface with, or load balance to, a farm of real servers 316 (e.g., 10.1.1.101-103), real servers 318 (e.g., 10.2.1.101-103), and real servers 320 (e.g., 10.3.1.101-103). In particular embodiments, a recirculated user request within the SLB device (e.g., SLB 308) can be accommodated.

Figure 4:
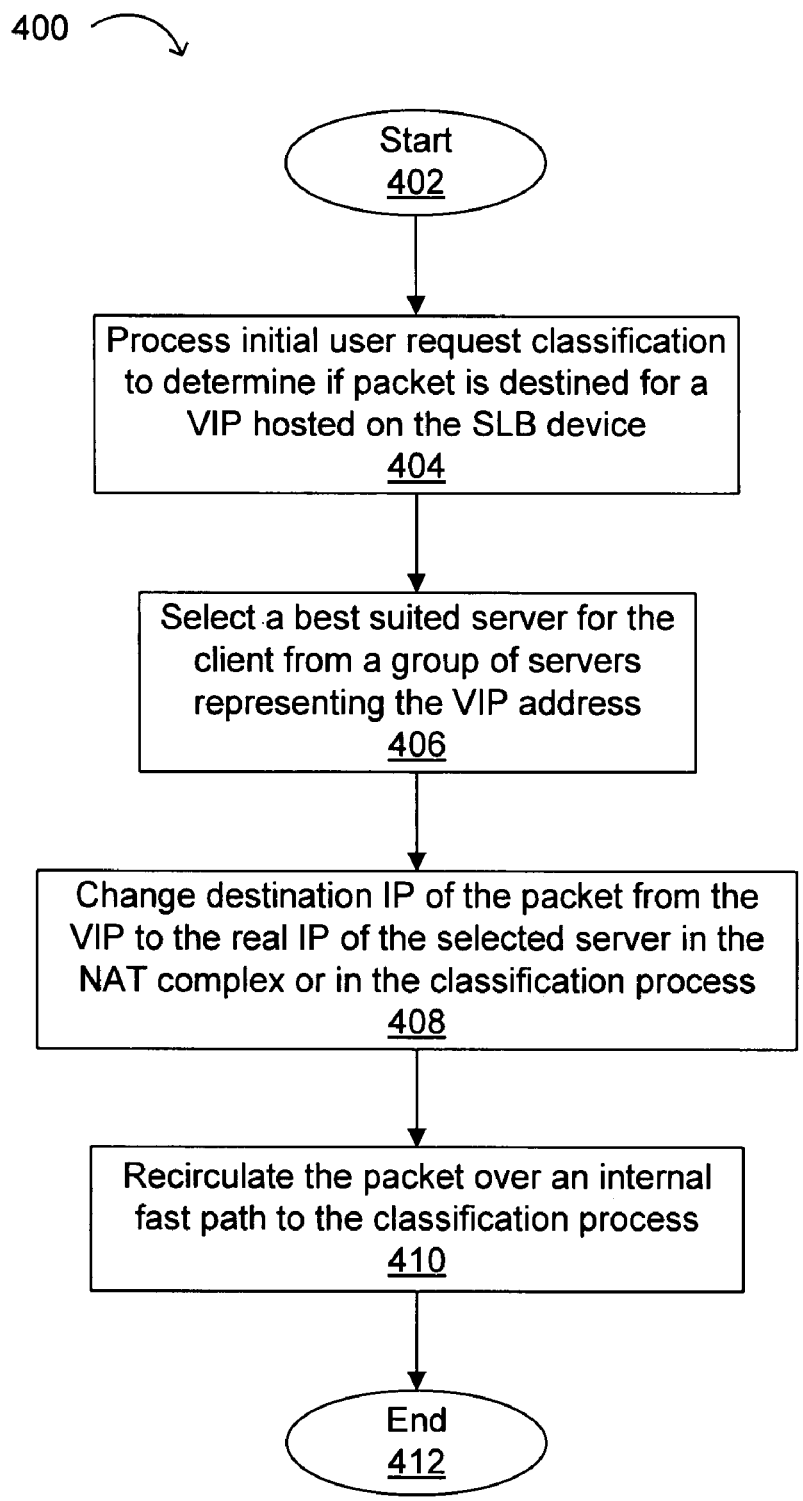
FIG. 4 illustrates an example virtual server recirculation flow.

Referring now to FIG. 4, an example virtual server recirculation flow is shown and indicated by the general reference character 400. The flow can begin (402) with receipt of a user request. The initial user request can be classified to determine if a packet therein is destined for a VIP hosted on the SLB device (404). For example, such classification can be based on a destination IP address, a source IP address, or hypertext transfer protocol (HTTP) headers, just to name a few.

Next, a best suited server for the client can be selected from a group of servers representing the VIP address (406). If there are no existing flows and a VIP match is found, then the request may be handled by the load balancer process/CPU, where the best suited server for the client may be selected (e.g., a server from the group of servers that represent the VIP address). Further, this server selection can be done on a single or multiple policy match basis. Also, the server IP can be an internal VIP address hosted on the same SLB device. In this case, a keyword local to identify a server which is locally hosted as a VIP can be configured.

Next, the destination IP of the packet can be changed from the VIP to the real IP of the selected server in the NAT complex or in the classification process (408). If the load balancer is software-based, then this packet can be handed back to the classification process to be processed. However, if the load balancer uses distributed CPUs, then the packet may be forwarded to an NAT complex, where the destination IP of the packet may be changed from the VIP to the real IP of the selected server, which may again be a local VIP.

Next, the packet can be recirculated over an internal fast path to the classification process (410), and the flow can complete (412). Since the destination media access control (MAC) address of the packet may be local, the packet can be forwarded via such an internal fast path to the classification process/CPU, and the recirculated flows may follow the policy path. In particular embodiments, latency may be minimal due to the packet remaining within the device on a 10 Gb per second or more fast path. Accordingly, an overall transaction may be highly optimized and scalable, as compared to using multiple layers of content switching SLB devices. Further, looping within an SLB device may occur within the same functional software or hardware without any handoff to any other independent device (e.g., a secure sockets layer (SSL) card). Instead, packets may be sent over the backplane or the peripheral component interconnect (PCI) bus, thus remaining on the fast path.

In particular embodiments, a configuration keyword "local" against a server IP (e.g., real_ip__1) within a server farm can provide functionality including: (i) when the SLB device is made aware that the server IP (real_ip__1) is actually a local VIP, so no health checks or probes may need to be performed; and (ii) the health of this server IP may be the same as the health of the local VIP, which may be based on the status of servers associated with that VIP.

Accordingly, in particular embodiments an optimized way to address cascading virtual IP addresses in content switching can be provided. Further, multiple classification (e.g., from one VIP to another VIP) can be performed. In addition, VIP load balancing user requests to multiple other VIPs, where each load balances requests to a same or separate real servers, can be accommodated in particular embodiments.

Particular embodiments can allow for: (i) increased usability and maintenance for solutions using cascading VIPs; (ii) a singular device solution; (iii) faster response times for clients using multiple cascading SLB devices; (iv) relatively simple implementation of forwarding back packets to classifier CPU/process destined for local MAC addresses; and (v) other functionality advantages.

Figure 5:
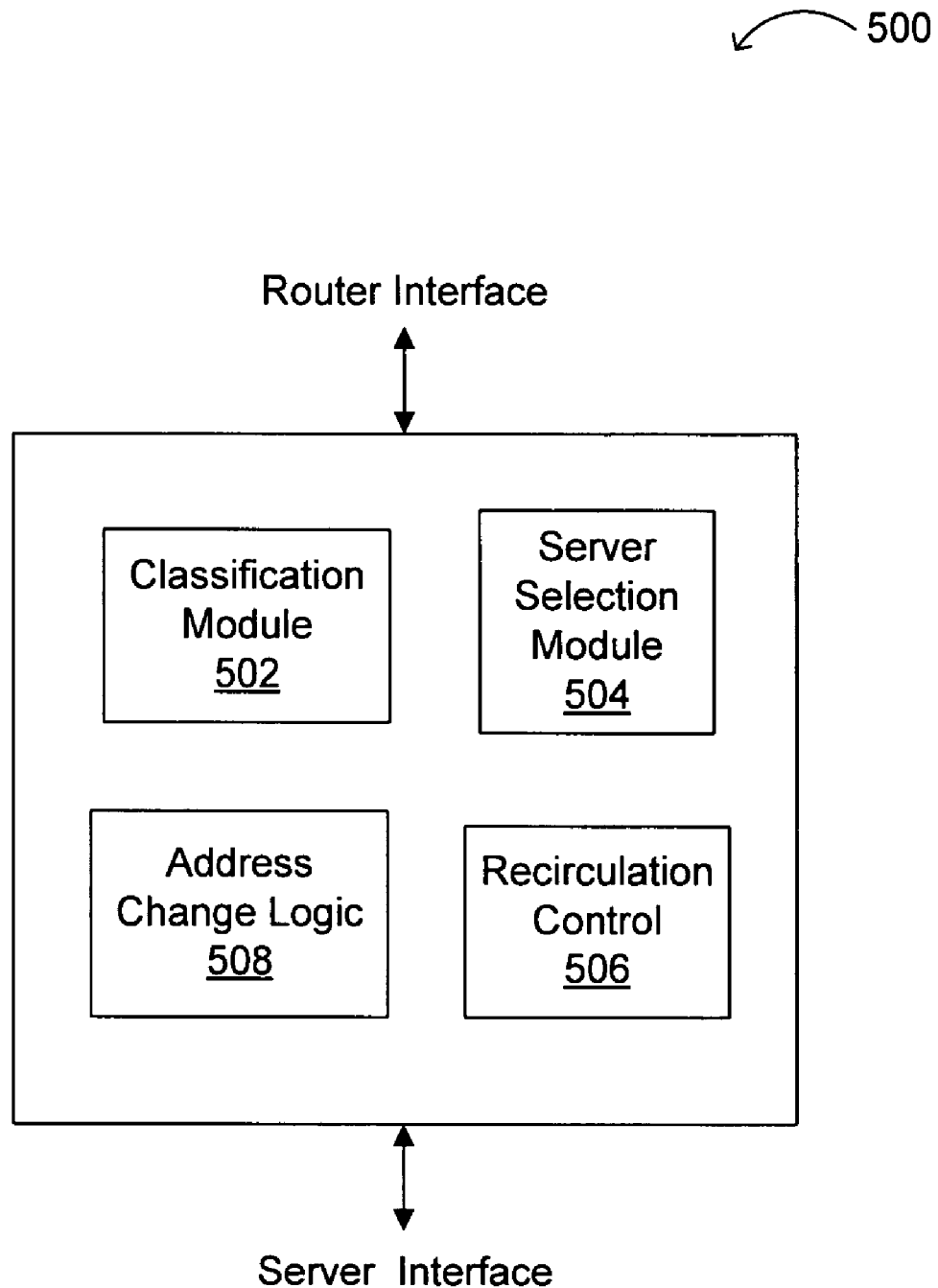
FIG. 5 illustrates example SLB components.

Referring now to FIG. 5, example SLB components are shown and indicated by the general reference character 500. Such an SLB can interface to a router (e.g., 306 in FIG. 3), as well as to real servers (e.g., 316, 318, and 320 in FIG. 3). In the particular example of FIG. 5, SLB components can include classification module 502, server selection module 504, address change logic 508, and recirculation control 506.

Although the description has been described with respect to particular embodiments thereof, these particular embodiments are merely illustrative, and not restrictive. For example, while particular server, SLB, router, cascading VIPs, and client arrangements have been described, other suitable arrangements and/or networks can be accommodated in particular embodiments. Also, while particular IP address examples have been provided, other types of addressing associated with devices suitable for load-balancing applications can also be utilized in particular embodiments.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as standalone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain and store the program for use by or in connection with the instruction execution system, apparatus, system, or device. The computer readable medium can be, by way of example only but not by limitation, a semiconductor system, apparatus, system, device, or computer memory.

Particular embodiments can be implemented in the form of control logic in software or hardware or a combination of both. The control logic, when executed by one or more processors, may be operable to perform that what is described in particular embodiments.

A "processor" or "process" includes any hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

I claim:

1. A method, comprising:
   classifying a packet in a server load balancer (SLB) for determining if the packet is destined for a virtual Internet protocol (VIP) address hosted on the SLB, wherein the SLB comprises a cascading arrangement of at least one top tier VIP, and a plurality of bottom tier VIPs;
   selecting a server from a group of servers representing the VIP address;
   changing a destination IP address of the packet from the VIP address to a real IP address of the selected server; and
   recirculating the packet for repeating the classifying, wherein the recirculating the packet comprises using an internal fast path, and wherein the internal fast path bypasses the SLB.

2. The method of claim 1, wherein the recirculating the packet comprises using an internal fast path between a classifier and a network address translation complex.

3. The method of claim 1, further comprising forwarding the packet to the selected server.

4. The method of claim 1, wherein the selected server comprises an internal VIP address on the SLB.

5. The method of claim 4, further comprising using a local keyword to identify the selected server.

6. The method of claim 1, wherein the changing the destination IP address comprises sending the packet to the classifying.

7. The method of claim 1, wherein the changing the destination IP address comprises forwarding the packet to a network address translation (NAT) complex.

8. An apparatus, comprising:
   a server load balancer (SLB) that receives a packet for classification to determine if the packet is destined for a virtual Internet protocol (VIP) address hosted on the SLB, wherein the SLB comprises a cascading arrangement of at least one top tier VIP, and a plurality of bottom tier VIPs;
   logic encoded in one or more tangible media for execution, and when executed operable to select a server from a group of servers representing the VIP address;
   logic encoded in one or more tangible media for execution, and when executed operable to change a destination IP address of the packet from the VIP address to a real IP address of the selected server; and
   logic encoded in one or more tangible media for execution, and when executed operable to recirculate the packet for repeating the classification, wherein the packet is recirculated using an internal fast path, and wherein the internal fast path bypasses the SLB.

9. The apparatus of claim 8, further comprising logic encoded in one or more tangible media for execution, and when executed operable to forward the packet to the selected server.

10. The apparatus of claim 8, wherein the selected server comprises an internal VIP address on the SLB.

11. The apparatus of claim 10, further comprising logic encoded in one or more tangible media for execution, and when executed operable to use a local keyword to identify the selected server.

12. The apparatus of claim 8, wherein the logic encoded in one or more tangible media for execution, and when executed operable to change the destination IP address comprises logic encoded in one or more tangible media for execution, and when executed operable to send the packet for repeating the classification when the SLB is software-based.

13. The apparatus of claim 8, wherein the logic encoded in one or more tangible media for execution, and when executed operable to change the destination IP address comprises logic encoded in one or more tangible media for execution, and when executed operable to forward the packet to a network address translation (NAT) complex when the SLB uses distributed processors.

14. A means for virtual server recirculation, the means comprising:

a means for classifying a packet in a server load balancer (SLB) for determining if the packet is destined for a virtual Internet protocol (VIP) address hosted on the SLB, wherein the SLB comprises a cascading arrangement of at least one top tier VIP, and a plurality of bottom tier VIPs;

a means for selecting a server from a group of servers representing the VIP address;

a means for changing a destination IP address of the packet from the VIP address to a real IP address of the selected server; and a means for recirculating the packet for repeating the classifying, wherein the means for recirculating the packet comprises a means for using an internal fast path, and wherein the internal fast path bypasses the SLB.

\* \* \* \* \*